(12) United States Patent
Gladfelter et al.

(10) Patent No.: US 6,309,721 B1
(45) Date of Patent: Oct. 30, 2001

(54) FLEXIBLE PROTECTIVE SLEEVE

(75) Inventors: Harry F. Gladfelter, Kimberton, PA (US); Robert J. Brushafer, Dansville, NY (US)

(73) Assignee: Federal-Mogul Systems Protection Group, Inc., Exton, PA (US)

(*) Notice: Subject to any disclaimer, the term of this patent is extended or adjusted under 35 U.S.C. 154(b) by 0 days.

(21) Appl. No.: 09/205,408

(22) Filed: Dec. 3, 1998

Related U.S. Application Data

(63) Continuation-in-part of application No. 08/779,110, filed on Jan. 6, 1997, now Pat. No. 5,849,379.

(51) Int. Cl.[7] .............................. B29D 22/00; D04H 1/08; B32B 5/26
(52) U.S. Cl. ..................... 428/36.1; 428/34.1; 428/36.3; 428/298.1; 442/320; 442/326
(58) Field of Search ................................. 442/320, 324, 442/326; 428/298.1, 34.1, 36.1, 36.3

(56) References Cited

U.S. PATENT DOCUMENTS

| | | | |
|---|---|---|---|
| 1,813,039 | 7/1931 | Escol . | |
| 3,060,069 | 10/1962 | Sindars | 154/45 |
| 3,571,863 | 3/1971 | Logan | 24/123 |
| 4,214,147 | 7/1980 | Kraver | 219/301 |
| 4,442,585 | 4/1984 | McGehee, Sr. et al. | 29/432 |
| 4,570,679 | 2/1986 | Schippl | 138/149 |
| 4,970,351 | 11/1990 | Kirlin | 174/68.3 |
| 5,304,408 | 4/1994 | Jarosz et al. | 428/75 |
| 5,435,871 | 7/1995 | Streit | 156/201 |
| 5,617,900 | 4/1997 | Weil | 138/127 |
| 5,849,379 | 12/1998 | Gladfelter et al. | 428/35.8 |

FOREIGN PATENT DOCUMENTS

| | | | |
|---|---|---|---|
| 249215 | 4/1948 | (CH) . | |
| 38 21 468 | 12/1989 | (DE) | F16L/59/00 |
| 011196 | 5/1980 | (EP) | F16L/59/14 |
| 224824 | 6/1987 | (EP) | F16L/59/16 |

Primary Examiner—Elizabeth M. Cole
Assistant Examiner—Ula C. Ruddock
(74) Attorney, Agent, or Firm—Synnestvedt & Lechner LLP

(57) ABSTRACT

A sleeve having a longitudinally extending slit for covering wires or tubing is provided with a support layer of a continuous monofilament of formable metal wire or heat-settable monofilament formed into a multiplicity of spaced apart reversely bent crests and troughs. The continuous monofilament is bent to form a split tube having the crests and troughs in facing relationship. At least one outer layer is provided on said support layer. The outer layer may be an insulator such as a metal foil or metalized film, an abrasion-resistant material or a resilient sound-absorbing material. Inner layers may comprise insulating materials and/or felts, foams or other sound-absorbing materials. Various closure means for closing the longitudinal opening formed at the slit are disclosed.

14 Claims, 2 Drawing Sheets

FIG.2A
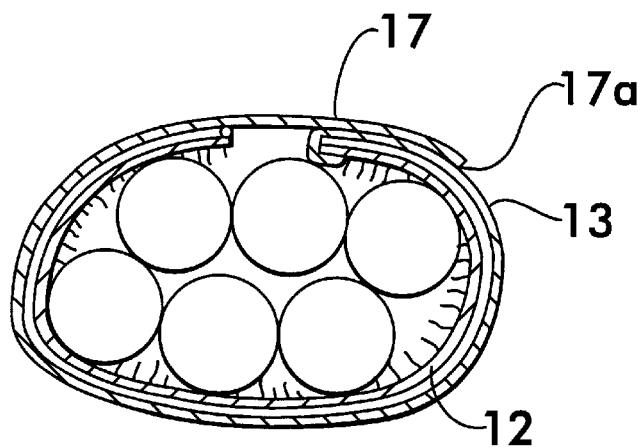
FIG.2B
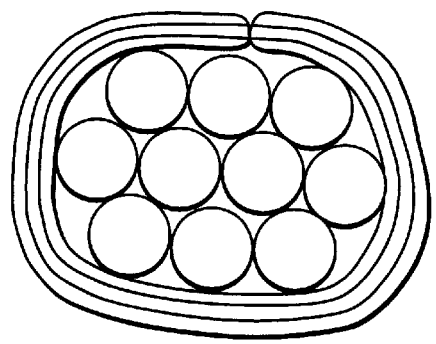
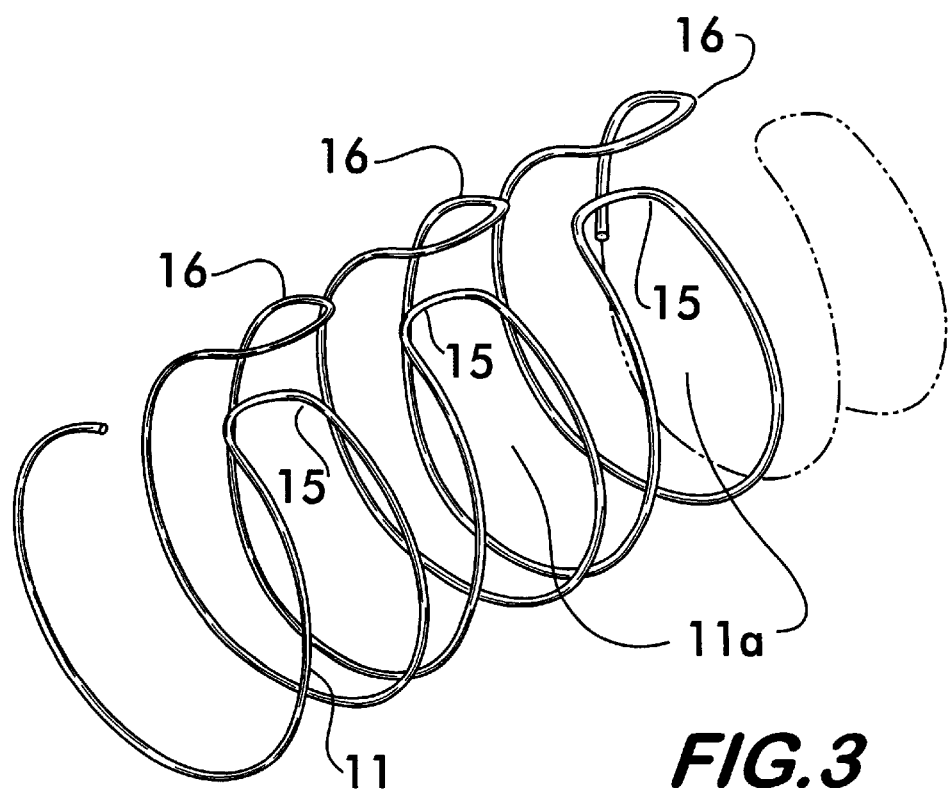
FIG.3

FLEXIBLE PROTECTIVE SLEEVE

RELATED APPLICATION

This application is a continuation-in-part of U.S. application Ser. No. 08/779,110, filed Jan. 6, 1997 now U.S. Pat. No. 5,849,379.

FIELD OF THE INVENTION

This invention relates to multi-layered sleeving products having longitudinal flexibility and, in particular, to sleeving products for protecting wires, cables and like items. By longitudinal flexibility is meant flexibility of the product on or along its longitudinal axis as, for example, the flexibility permitting a sleeving product carrying a bundle of wires to be bent around sharp corners of components in an automobile engine compartment.

BACKGROUND OF THE INVENTION

Various efforts have been made to provide low cost, light-weight sleeving for protection of cables, wires and tubular members against the effects of temperature, to isolate sources of heat or to provide protection of such components against abrasion or snagging by moving machinery parts.

For many purposes, corrugated tubes, particularly those having a longitudinally slit side wall or knitted, woven or braided sleeving, have proven to be highly satisfactory means for accomplishing this goal. These products are flexible and can be engineered to provide required properties such as abrasion resistance or thermal protection. However, they tend to be relatively expensive to make. A need has thus persisted for a cost-effective alternative having high durability for use, for example, in modern, high-performance automotive vehicles.

SUMMARY OF THE INVENTION

According to the invention, novel sleeving products are provided which fit over elongated components of generally uniform cross-section in a vehicle. The products comprise a tubular support layer or skeleton of a continuous, formable monofilament. The monofilanment is first bent in serpentine fashion and then bent about its longitudinal axis, so as to form a generally C-shaped or clam shell cross-section. At least one outer layer, and preferably one inner layer, are disposed outside and inside of the tubular support layer. According to the invention, the monofilament may consist of a resilient metal or a heat-settable polymeric material. The monofilament should possess sufficient rigidity to provide high hoop strength and a high degree of flexibility longitudinally, much like that provided by conventional polymeric corrugated tubing and is of light weight. An advantage of this construction is that a tubular product incorporating the wire support layer may be bent around objects without kinking.

Various product configurations may be achieved according to the invention. One product comprises an outer covering layer of a metal foil, a metalized film or a bi-laminate of a foil and film which, in each instance, provides a reflective surface for reflecting heat away from the sleeve. One or more insulating layers may be provided inside and/or outside of the tubular support layer.

A further embodiment of the invention provides a layer of relatively soft material such as a felt or a foam. The felt or foam may be an internal layer to protect against Vibration noises caused by vibration of the components being protected, an external layer to protect against noise generated by objects vibrating against the outer surface of the sleeving or a combination of both layers protecting against both types of vibration.

Still other embodiments of the invention include an abrasion-resistant outer layer, together with one or more thermal insulating layers or sound-absorbing internal layers. Each embodiment of the invention includes a skeleton formed by a continuous monofilament supporting member first bent in serpentine form and then bent into a generally C-shaped cross-section, so as to provide support for the other layers and provide the frame work for a longitudinally flexible sleeve with high hoop strength. Preferably, the sleeves have a longitudinal side opening through which the elongated elements can be readily inserted.

In each embodiment having a longitudinal side opening, various closure means may be used to provide for closure of the side opening without the need for time-consuming adhesive tape wrappings or ties. One preferred form of closure comprises a flap of material extending from the upper layer adjacent one side edge of the opening. Preferably, the closure means comprises pressure-sensitive adhesive bands applied to the flap for securement to the outer surface of the sleeve along the opposite edge of the opening.

Still another embodiment comprises co-adhesive bands applied to the outer surface of the sleeve along one edge of the opening and another co-adhesive band applied to the flap in position so that the two bands may be interengaged and permanently secured together. Alternatively, hoop-and-loop tape strips of the kind marketed under the trademark VELCRO may be used in place of the co-adhesive.

Another embodiment comprises the provision of one or more flaps which extend from the side edges of the opening and are adapted to be tucked through the opening into the cavity formed by the tape after the elongated articles have been inserted. These side edge flaps function in the nature of one way valves in that they allow for insertion of wires or cables or tubes into the sleeve during installation but act to restrict their movement out of the sleeve unless deliberate force is applied.

Finally, the continuous wire form may be fabricated so that the side edges defining the opening are resiliently biased to a closed position in which the edges are against one another. Finger pressure of the worker separates the side edges during which the elongated items can be inserted or removed. Release of pressure allows for closure of the opening.

How the foregoing is achieved will become apparent from the following detailed description of the preferred embodiment of the invention.

BRIEF DESCRIPTION OF THE DRAWINGS

FIG. 2a is a cross-sectional view similar to FIG. 2 illustrating an alternative closure flap;

FIG. 2b illustrates an additional embodiment of the invention; and

FIG. 3 illustrates the continuous monofilament member utilized in the formation of the supporting frame layer of the invention.

DETAILED DESCRIPTION OF THE PREFERRED EMBODIMENT OF THE INVENTION

Figure 1:
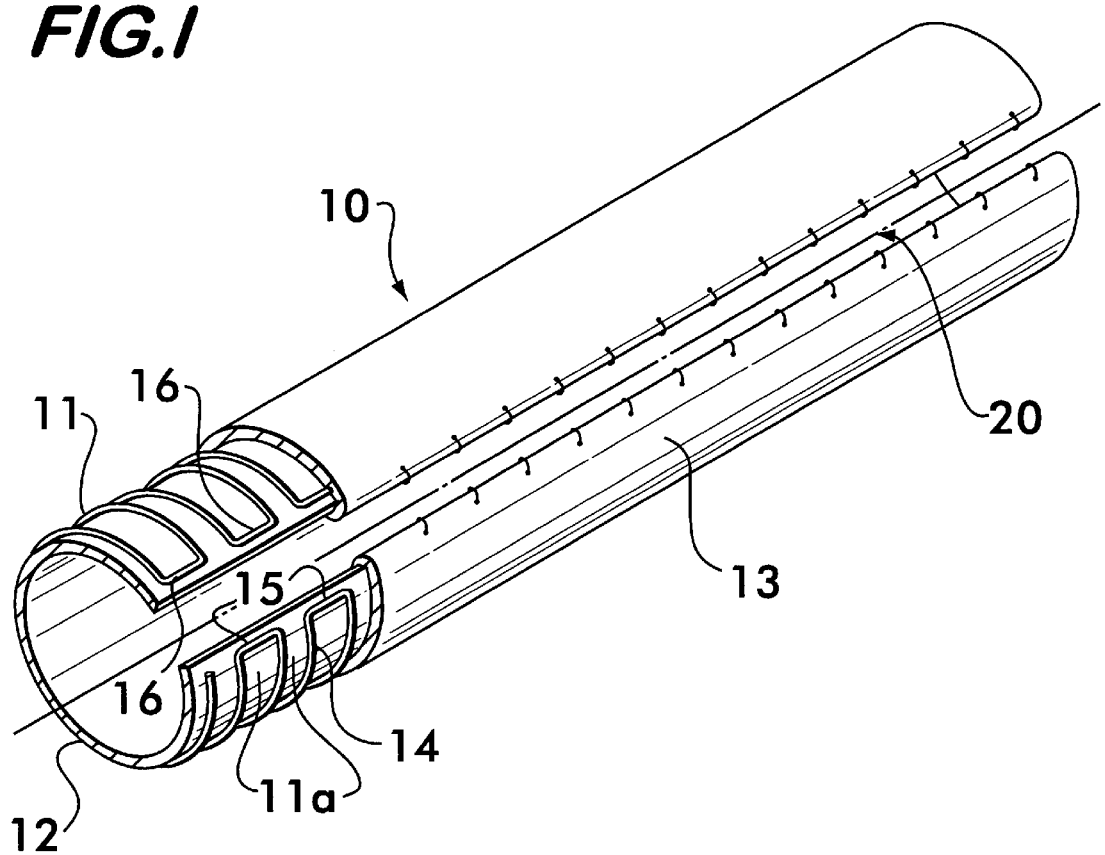
FIG. 1 is a perspective view of sleeving illustrating a preferred embodiment of the invention.

With reference to FIG. 1, a sleeve 10 is illustrated having a support layer 11 sandwiched between inner layer 12 and outer layer 13. Support layer 11 comprises a continuous monofilament of bendable material first bent in serpentine fashion and then bent about a long axis as that it is generally C-shaped when viewed along the axis as shown at 14 in FIGS. 1 and 3. The monofilament may be a resilient metal wire having sufficient ductility to allow for bending into desired shape and thereafter resiliently maintaining that shape despite repeated flexures. For certain purposes, a non-metallic monofilament member comprised of resiliently settable polymeric material is preferred. The metallic wire form is of the type sold by Renz America of Agawan, Massachusetts, and is commonly used for the purpose of binding the pages of notebooks. This wire is first laid out on a flat surface and is pre-bent into what is commonly termed a comb configuration by imparting to it a multiplicity of reverse or serpentine bends 15 and 16 jioned by generally parallel rons 11a. It is then bent about its long axis into a generally C-shaped cross-section in a separate processing step so that it defines an interior cavity with a lengthwise extending opening formed along one side. The wire support layer is readily flexible on its long axis much like the corrugated tubing commonly called convolute and has a relatively high hoop strength. However, for many applications, it is preferred that the wire have sufficient ductility to permit the bends 15 and 16 which define the elongated opening to be crimped closely together once the sleeve has been fitted over objects to be protected. Steel wire having a diameter of about 0.060 inches is readily available for use for a support structure having the required properties.

As indicated above, for certain applications, it has been found that ordinary non-ductile materials which can be resiliently set may be employed and will produce excellent results. As used herein, "resilient set" and "resiliently set" refer to the incorporation of a permanent set or bias in a resilient filamentary material. Of particular interest are polymeric heat-settable materials. Using such materials, a thermoplastic monofilament is formed by application of heat during bending to provide the serpentine configuration. The serpentine monofilament is then bent about its long axis to assume the C-shaped cross-section with further application of heat and thereafter allowed to cool. This treatment accomplishes a resilient set or bias in the material which is retained during use. In the set configuration, the serpentine wire may be biased to a closed position. When a sleeve is constructed, the longitudinal opening is likewise biased to the closed position. However, it may be readily opened to insert or to remove elongated articles being protected. Optionally, the bias may be such that the sleeve is left open sufficiently to permit ease of access to the interior.

Typical polymeric materials useful for the non-metallic monofilament are polyester and PVC. Polymeric monofilaments useful in carrying out the teachings of the invention in the manufacture of sleeves of diameter ranging from about 0.5 inches to about 2 inches, typically have a diameter of between about 0.020 inches and about 0.080 inches.

Figure 2:
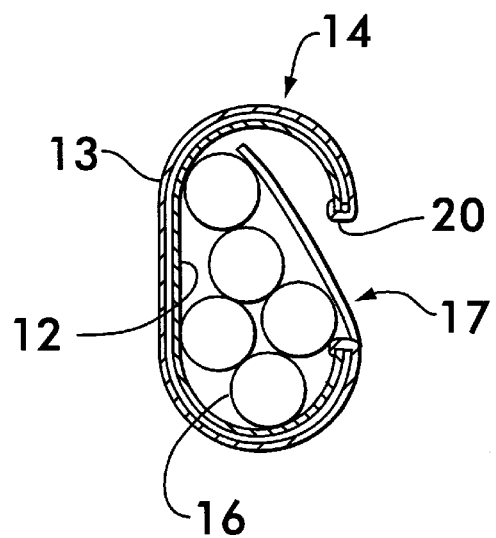
FIG. 2 is a right sectional view showing a sleeve similar to FIG. 1 in which a plurality of elongated tubular members have been inserted.

With particular reference to FIGS. 1 and 2–2b, several preferred embodiments of sleeves formed according to the invention are illustrated. As shown in FIG. 1, wire form support layer 11 is sandwiched between inner and outer layers 12 and 13. Inner and outer layers 12 and 13 may be comprised of a variety of materials depending upon the conditions to which the sleeve is to be exposed. In one preferred form, an abrasion-resistant sleeve may be constructed using inner and outer layers of polyester film. The film layers may be stitched together, as illustrated, or adhesively secured or heat bonded to form an interlocked, laminated three-layer product having high hoop strength but substantial flexibility in the lengthwise direction. A product so formed can be of very light weight. Where high temperature exposure is not of concern, the wire of the support layer 11 may be a resiliently settable polymeric material in order to achieve further weight reductions.

As further illustrated in FIG. 2, in a three layered sleeve wherein the inner and outer layers are formed of polyester film, an extension of the outer layer 13 preferably serves as a closure flap 17 for retaining elongated items such as wires or tubes 18 within the cavity defined by the sleeve. As can be seen in FIG. 2, once the elongated items are inserted into the cavity, closure flap 17 is tucked inside opening 20.

Closure flap 17 and the outer layer 13 are preferably formed of a film such as polyester having a thickness of about 1 mil, although film thickness may range from about 0.5 mils up to a thickness of about 2 mils. Film material of this range of thicknesses will possess sufficient body so that it will not inadvertently slip out of the cavity during use. However, the film should not be so thick that it becomes difficult for a worker to easily remove the flap and manually gain access to the cavity.

Other inner and/or outer layer materials may be employed. For example, outer layer 13 may be a metalized PET film wherein the film is flashed with aluminum. Other examples include films to which a adhesively secured layer of a metal foil has been applied. Inner layer 12 may be a layer of insulating material or may be a felt or other sound-deadening material such as a foam-backed fabric, provided for the purpose of eliminating vibration-induced noise caused by vibration of the elongated substrates. The outer layer may be formed of a similar sound-absorbing material to eliminate noise caused should the sleeve vibrate against other parts of the vehicle. According to an alternate embodiment of the invention shown in FIG. 2a, closure means 17a may be provided in the form of a flap 17. Flap 17 extends from a first side edge of opening 20 and is provided with an internal surface layer of an adhesive so that it can be affixed to outer surface 13 adjacent the opposite edge. The adhesive may be a pressure-sensitive adhesive covered by a flap until needed or may be a co-adhesive interengagable with a complementary band of co-adhesive applied to the outer layer 13 inboard of the opposite side edge of the elongated opening. Examples of co-adhesives are those based on natural or neoprene rubber. Alternatively, the closure means may comprise bands of hook-and-loop fastening tape on the flap and the outer surface inboard the second side edge. As illustrated in FIG. 2a, inner layer 12 may comprise a soft material such as a flocked fabric layer or a felt, a foam or a fabric/foam laminate, thereby serving as a cushioning means for the elimination of noise caused by vibration of the elongated substrates.

With reference to FIG. 2b, there is illustrated a sleeve having a monofilament support layer formed of polyester or other heat-settable polymeric material. In the embodiment of FIG. 2b, the heat-settable polymeric material is resiliently set in a position in which the opening is substantially closed. The edges of the opening may be spread apart by hand to permit the insertion of the substrates. Once inserted into the cavity, finger pressure on the edge of the opening is released and the biasing property of the resiliently set material biases the sleeve to the closed position. In place of a support layer of resiliently settable polymeric materials, a resilient wire support layer may be substituted if desired.

Although the preferred embodiments contemplate provision of a sleeve with a longitudinally extending side opening, thereby facilitating installation over previously installed wires and tubes and allowing for access and for breakout, it should be understood that sleeving products having no side opening have properties of high hoop strength and longitudinal flexibility and are also considered to be within the scope of the invention.

In summary, in all embodiments of the invention, a sleeve having excellent flexibility in the lengthwise direction is disclosed. The sleeve may be bent around relatively sharp corners without kinking. Products formed according to the invention have high hoop strength preventing damage to the items being protected. Products formed according to the invention are inexpensive to manufacture and are of a durable nature. The substrates may be held in place within the sleeving without the need for the labor-intensive procedure of wrapping with tape.

What is claimed is:

1. A flexible sleeve for the protection of elongated articles comprising:

a supporting frame having longitudinal flexibility and lateral rigidity, said supporting frame layer comprising a stiff, formable, continuous monofilament member extending lengthwise of the sleeve, said monofilament member being formed into a plurality of spaced, generally parallel runs, each run being joined at one end by a reverse bend to the beginning of the next adjacent run, the generally parallel runs of said continuous monofilament member being formed about an axis extending lengthwise of the sleeve to assume a generally C-shaped cross-section to define an axially extending interior region;

a flexible inner layer of sound absorbing material, said inner layer being located interiorly of supporting frame layer; and an outer cover layer of flexible material separate from the supported frame layer, said cover layer surrounding and being supported by said supporting frame layer, said outer cover layer being substantially co-extensive in length with said supporting frame layer.

2. A sleeve according to claim 1, wherein said continuous monofilament member comprises a non-metallic material.

3. A sleeve according to claim 1, wherein said outer cover layer is comprised of a metallic material having a reflective outer surface.

4. A sleeve according to claim 1, wherein said sound absorbing material is bonded to said outer layer.

5. A sleeve according to claim 4, wherein said outer layer is a felt material.

6. A sleeve according to claim 5, wherein said inner layer is a non-woven material.

7. A sleeve according to claim 6, wherein said inner layer is a felt material.

8. A sleeve according to claim 6, wherein said inner layer is a flocked fabric.

9. A sleeve according to claim 1, wherein said outer layer further comprises first and second edge portions extending respectively from said reverse bends, and a flexible flap extending from one of said edge portions, said flexible flap being extendible from said one of said edge portions into overlapping relationship with the second of said edge portions, and means for securing the closure flap to the outer layer adjacent to the second of said edge portions.

10. A sleeve according to claim 9, wherein said means for securing the closure flap comprises a band of pressure-sensitive adhesive applied to the flap and extending lengthwise thereof.

11. A sleeve according to claim 9, wherein the means for securing the closure flap to the outer layer comprises interengagable co-adhesive regions.

12. A sleeve according to claim 1, wherein said outer layer further comprises first and second edge portions extending respectively from the boundaries of the opening defined by said reverse bends, and a flexible retainer flap extending from one of said edge portions and dimensioned to extend through the opening a distance sufficient to retain elongated articles within said opening.

13. A sleeve according to claim 1, wherein said inner and said outer layers each comprise a thermoplastic film, said film layers having contiguous thermally bonded surfaces forming a laminate with said continuous monofilament member being fixed between said inner and outer layers.

14. A sleeve according to claim 13, wherein said continuous monofilament member consists essentially of a heat-settable material, said heat-settable monofilament member being heat-set in said C-shaped cross-section following thermal bonding of said inner and said outer layers.

* * * * *